United States Patent [19]

McKinley

[11] Patent Number: 5,097,359
[45] Date of Patent: Mar. 17, 1992

[54] ENDOSCOPE RELAY LENS CONFIGURATION

[75] Inventor: Harry R. McKinley, Southampton, Mass.

[73] Assignee: McKinley Optics, Inc., Southampton, Mass.

[21] Appl. No.: 664,818

[22] Filed: Mar. 5, 1991

Related U.S. Application Data

[63] Continuation-in-part of Ser. No. 507,877, Apr. 12, 1990.

[51] Int. Cl.[5] .................... G02B 23/24; G02B 11/04; G02B 9/04; G02B 9/60
[52] U.S. Cl. .................................. 359/435; 359/763; 359/784; 359/793; 359/797; 128/6
[58] Field of Search ........ 350/501, 504, 505, 572–574, 350/450, 465–468, 474–481, 432, 482–483; 128/416

[56] References Cited

U.S. PATENT DOCUMENTS

| | | | |
|---|---|---|---|
| 4,148,551 | 4/1979 | MacAnally | 350/573 |
| 4,354,730 | 10/1982 | Bel | 350/483 |
| 4,545,652 | 10/1985 | Hoogland | 350/432 |
| 4,575,195 | 3/1986 | Hoogland | 350/573 |
| 4,779,613 | 10/1988 | Hashiguchi et al. | 128/6 |
| 5,005,960 | 4/1991 | Heimbeck | 350/573 |

FOREIGN PATENT DOCUMENTS 57-207215 12/1982 Japan .

Primary Examiner—Bruce Y. Arnold
Assistant Examiner—James Phan
Attorney, Agent, or Firm—Lahive & Cockfield

[57] ABSTRACT

Relay lenses for endoscopy include an axially symmetrical three-part optical component having a thin symmetrical negative element interposed between identical, substantially spherical outside elements; and an axially symmetrical five-part optical component in which the three-part component described above is disposed between two additional outer components.

13 Claims, 3 Drawing Sheets

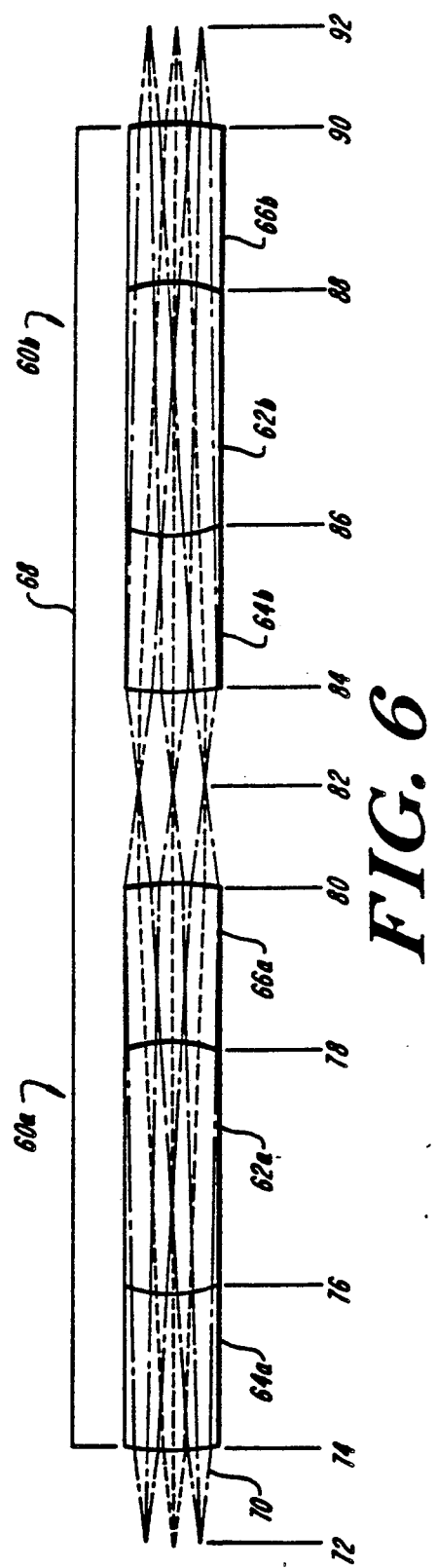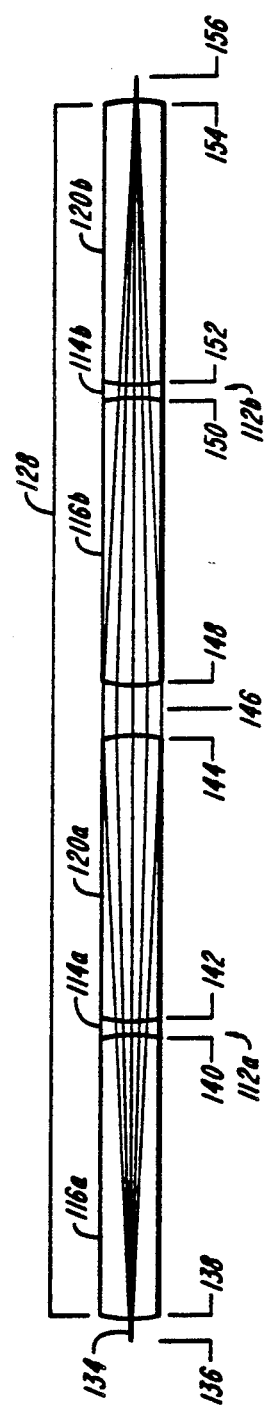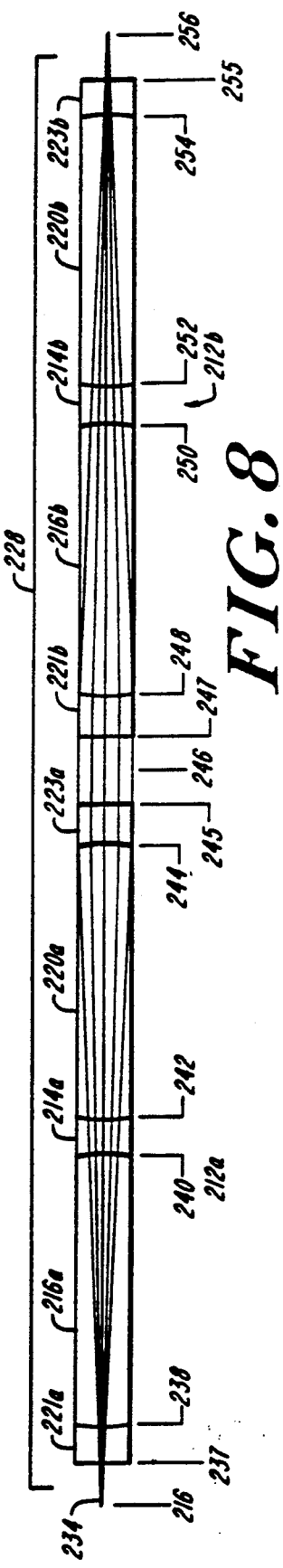

ENDOSCOPE RELAY LENS CONFIGURATION

REFERENCE TO RELATED APPLICATIONS

This application is a continuation-in-part of U.S. patent application Ser. No. 07/507,877 filed Apr. 12, 1990 for Endoscope Lens System, assigned to the assignee hereof. The teachings of U.S. Ser. No. 07/507,877 are incorporated herein by reference.

BACKGROUND OF THE INVENTION

This invention relates generally to optical lens systems, and, more particularly, relates to relay lens designs adapted for use in medical endoscopes.

Medical endoscopes are widely utilized to view internal regions of the human body during diagnostic, surgical, and other medical procedures. Endoscopes typically include a long, thin, rigid or semi-rigid optical cylinder affixed to a viewing mechanism. The cylinder is sufficiently narrow to be inserted through a small openings in the body, which may be natural or surgical. When the endoscope is inserted and positioned for use, an image of the object being viewed is formed at an inserted end of the endoscope by an objective lens. The image passes through a series of relay lenses down the cylinder to an eye lens or video camera at a viewing end of the endoscope.

The relay lenses must be very narrow and are typically around 2.4 mm to 3.0 mm in diameter, and 20 mm to 30 mm long. Each relay lens is usually made of two or more elements and a pair of two relay lenses make up a set of relay lenses. Most endoscopes require two or more sets of relay lens pairs for proper operation. The number of sets depends on the length and specific requirements of a particular endoscope.

Additionally, unique optical characteristics of each relay lens require specific spacing distances between a pair of relay lenses within a set, and between sets of relay lens pairs within an endoscope. The required distances are typically maintained by inter-lens spacers which may be hollow cylindrical elements.

Conventional relay lenses generally include one or two relatively thin end lenses affixed to a substantially thicker center lens. Where one end lens is affixed to a center lens the resulting relay lens is frequently referred to as a "doublet." Where two end lenses are affixed to opposed ends of a center lens, the relay lens is referred to as a "triplet." Both doublets and triplets are disclosed in U.S. Pat. No. 4,575,195 to Hoogland.

Problems associated with known relay lenses include the high cost of accurately affixing the end lenses to the center lens. Typically, lenses are assembled within standard optical "V-blocks", but the thin end lenses tend to be unstable unless mechanically supported within the "V-blocks" during cementing. The diameter-to-thickness ratio of most end lenses is roughly comparable to that of standard corrective contact lenses. The difficulty of affixing such end lenses is exacerbated in the manufacture of triplets because the end lenses have to be precisely aligned on the opposed ends of the center lens, such that all three lenses share a common central axis.

An additional problem associated with conventional relay lenses is the requirement that the relay lenses and inter-lens spacers be inserted into the optical cylinder of the endoscope in a specific alignment and in a specific sequence. Frequently, during assembly of the endoscope, relay lenses are inadvertently inserted in the wrong sequence, or in an inverted position. Moreover, inter-lens spacers are often inserted in an improper sequence. Such errors may not be detected until the endoscope is tested by an end-user. Disassembly and extraction of the lenses and spacers is a difficult, time consuming and costly procedure.

A further limitation of conventional relay lens configurations is the high cost of manufacture of the end lenses and center lenses. Center lenses, in particular, require very delicate procedures. They are relatively long, extremely thin, typically made of glass, and therefore, crack and break easily. Additionally, precisely curved lens surfaces must be formed on each end surface of the center lens. Moreover, some relay lenses utilize different end lenses attached to the same center lens. Essentially, they require manufacture of three separate lenses for each relay lens.

Thus, because of structural limitations associated with the relatively short axial dimension of their end lenses, conventional relay lenses are difficult to fabricate. Conventional designs require extreme care in assembly within an endoscope due to the varying alignment and space requirements of the relay lenses and inter-lens spacers. Moreover, they are costly to manufacture due to the relatively long axial lengths of their center lenses and the need for multiple lens surfaces.

Certain of these problems are overcome by the lens designs disclosed in U.S. patent application Ser. No. 07/507,877 filed Apr. 12, 1990 for Endoscope Lens System.

The endoscope relay lens designs disclosed in U.S. patent application Ser. No. 07/507,877 utilize symmetrical component configurations having a center element that is at least axially symmetrical. The central element can be, for example, semi-spherical ball element.

In particular, one embodiment disclosed in U.S. Ser. No. 07/507,877 is a Symmetrical triplet lens assembly in which the center lens is substantially spherical, the outer elements are identical to each other and very thick compared to conventional endoscope relay lenses, and the mechanical spacers between the relay lenses are all identical in length. This configuration assures proper assembly, in that the relay lens cannot be inserted backwards, and that no unique sequence of spacers is required.

However, in the configuration disclosed in U.S. Ser. No. 07/507,877, the outer elements are quite long, and therefore difficult to manufacture without further dividing the outer elements.

Accordingly, it is the general object of the present invention to provide improved endoscope relay lens configurations that overcome the problems associated with known relay lens designs.

It is a more specific object to provide an improved endoscope relay lens that has elements that facilitate assembly of the relay lens.

It is another object to provide an improved endoscope relay lens that facilitates alignment and spacing of the relay lenses within an endoscope.

It is yet another object to provide an improved endoscope relay lens that has elements that are substantially less expensive to manufacture than the elements of known relay lenses.

It is still another object to provide an improved endoscope relay lens that has optical performance characteristics that are substantially superior to the performance characteristics of known relay lenses.

The above and other objects and advantages of this invention will become more readily apparent when the following description is read in conjunction with the accompanying drawings.

SUMMARY OF THE INVENTION

The foregoing objects are attained by the invention, which provides an improved optical endoscope relay lens configurations for transmitting optical images along the narrow cylinder of an endoscope. Sets of relay lens pairs can be secured within the cylindrical body of the endoscope.

One aspect of the invention relates to an axially symmetrical three-part optical component having a thin symmetrical negative element interposed between identical, substantially spherical outside elements. The spherical outside elements can utilize low-index glass or plastic. This three-part component is referred to herein as a "Type 3" relay optical system.

Another aspect of the invention relates to an axially symmetrical five-part optical component in which the three-part component described above is interposed between two additional outer components. This five-part component is referred to herein as a "Type 4" relay optical system. The outer elements of the Type 4 system provide additional degrees of freedom in the optical design and selection process, sufficient to eliminate the need for low-index material in the spherical elements, and consequently enabling substantially increased light-gathering power.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a more complete understanding of the nature and objects of the invention, reference should be made to the following detailed description and the accompanying drawings, in which:

FIG. 6 is an optical schematic view of a set of the Type 2 relay lenses of FIG. 5, showing light rays passing through the set;

FIG. 7 is a schematic diagram depicting a Type 3 optical system constructed in accordance with the present invention, showing light rays passing through the system; and FIG. 8 is a schematic diagram depicting a Type 4 embodiment of an endoscope relay optical system constructed in accordance with the present invention, also showing light rays passing through the system.

DESCRIPTION OF ILLUSTRATED EMBODIMENTS

FIGS. 1-6 depict endoscope relay optical systems constructed in accordance with the disclosure of U.S. Ser. No. 07/507,877. These relay optical systems, referred to herein as "Type 1" and "Type 2," respectively, are symmetrical triplet lens assemblies in which the center lens is substantially spherical. The outer elements are identical to each other and very thick compared to conventional endoscope relay lenses. The mechanical spacers interposed between the relay lenses are all identical in length. This configuration assures proper assembly, in that the relay lens cannot be inserted backwards, and the spacers only have to be placed between the relay lenses without a unique sequence.

Figure 1:
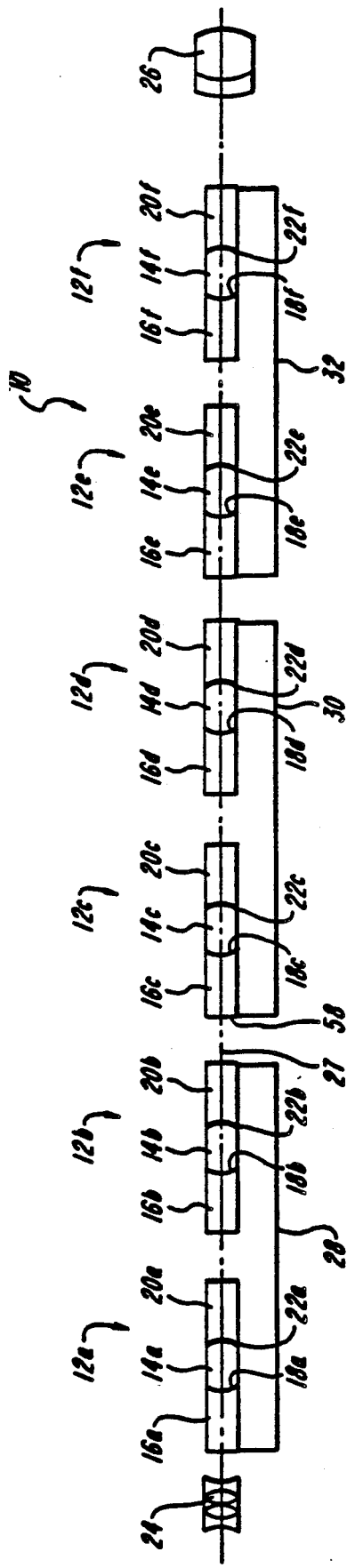
FIG. 1 is an optical schematic view of an endoscope disclosed in related application U.S. Ser. No. 07/507,877, wherein three sets of relay lens pairs are disposed between an objective lens and an eye lens.

In particular, FIG. 1 depicts a medical endoscope 10 utilizing the Type 1 relay lens system disclosed in related application U.S. Ser. No. 07/507,877. The Type 1 relay lenses 12$a,b,c,d,e,f$ each include a center lens 14$a,b,c,d,e,f$ with a first end lens 16$a,b,c,d,e,f$ affixed to a first surface 18$a,b,c,d,e,f$ of center lens 14$a,b,c,d,e,f$; and a second end lens 20$a,b,c,d,e,f$ affixed to a second surface 22$a,b,c,d,e,f$ of center lens 14$a,b,c,d,e,f$. In the endoscope of FIG. 1, relay lenses 12$a,b,c,d,e,f$ are disposed between an objective lens 24 and an eye lens 26. When the endoscope 10 is straight, objective lens 24, relay lenses 12$a,b,c,d,e,f$ and eye lens 26 share a common central axis 27. The relay lenses 12$a,b,c,d,e,f$ are arranged in three sets 28, 30, 32 of relay lens pairs. The first set 28 includes a pair of two relay lenses 12$a$ and 12$b$; the second set includes a pair 12$c$ and 12$d$; and the third set includes a pair of relay lenses 12$e$ and 12$f$.

Figure 2:
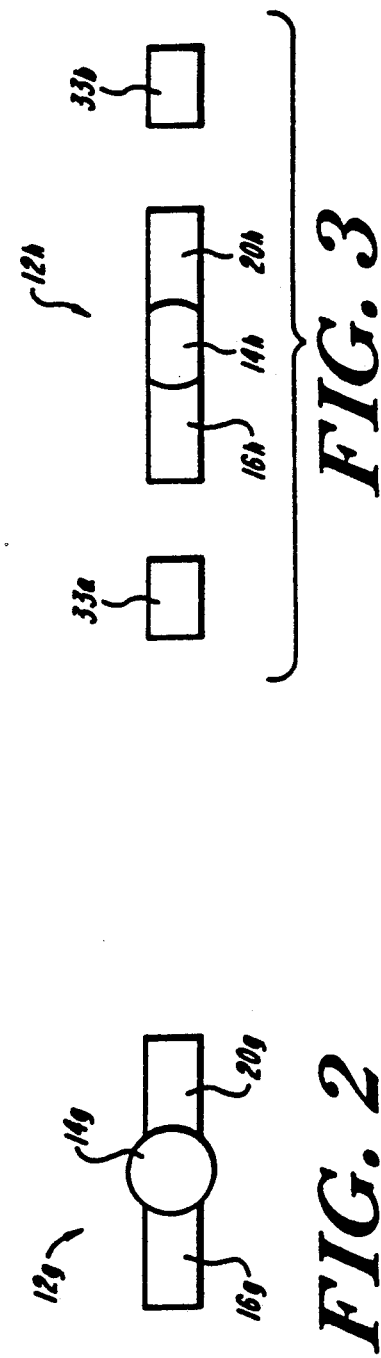
FIG. 2 is a schematic view of a Type 1 relay optical system utilized in the endoscope of FIG. 1, having a spherical center lens, as disclosed in related application U.S. Ser. No. 07/507,877.

Important features of the Type 1 relay lens system of related application U.S. Ser. No. *07/507,877* are depicted in FIG. 2. A first end lens 16$g$ and second end lens 20$g$ are shown affixed to spherical center lens 14$g$. The end lenses 16$g$, 20$g$ are relatively long. This length facilitates manipulation of the relay lens 12$g$ during construction of the optical system, particularly during cementing of the end lenses 16$g$, 20$g$ to the center lens 14$g$. Typically, a first end lens 16$g$ is cemented to a spherical center lens 14$g$. The center lens is then polished down to a cylinder by standard optical shop methods. The second end lens 209 is then aligned with the first end lens 16$g$ and center lens 14$g$, and cemented to the center lens 14$g$ in a standard optical "V-block."

Figure 3:
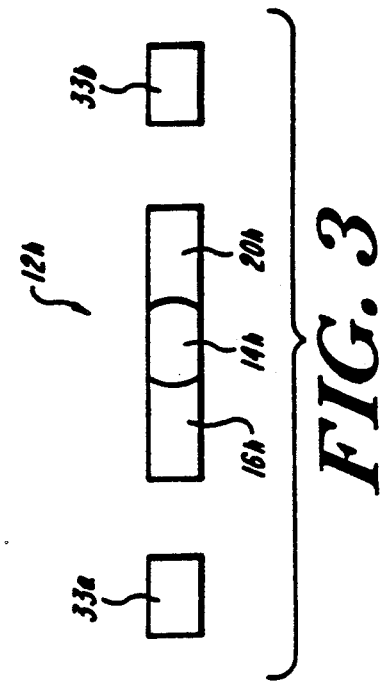
FIG. 3 is an optical schematic view of a relay lens of FIG. 2 showing the spherical center lens and identical inter-lens spacers.

FIG. 3 shows the completed Type 1 relay lens 12$h$, wherein end lenses 16$h$, 20$h$ are affixed to the cylindrical, spherical center lens 14$h$. FIG. 3 also depicts detached, identical inter-lens spacers 33$a,b$.

Figure 4:
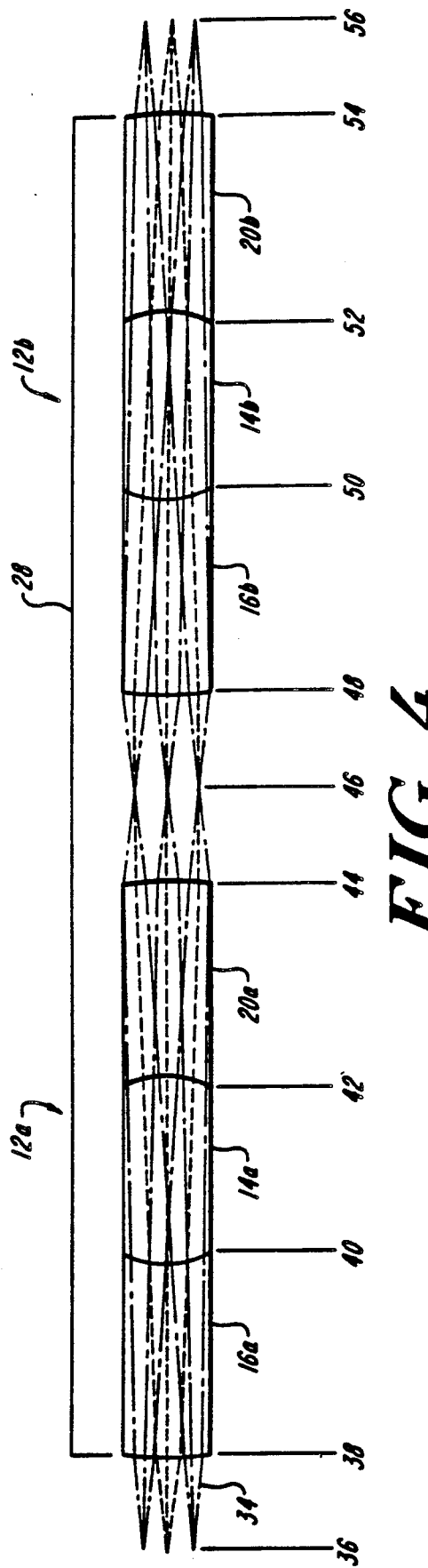
FIG. 4 depicts a set of the Type 1 relay lenses of FIG. 3, showing light rays passing through the set.

FIG. 4 shows light rays 34 passing through a first set 28 of Type I relay lenses 12$a$, 12$b$. The rays 34 and relay lens set 28 define a specific sequence of eleven optical surfaces shown in vertical lines. A first optical surface 36 defines an object plane. A second optical surface 38 defines an exterior surface of first end lens 16$a$. A third optical surface 40 defines an interior surface of first end lens 16$a$. A fourth optical surface 42 defines an interior surface of second end lens 20$a$. A fifth optical surface 44 defines an exterior surface of second end lens 20$a$. A sixth optical surface 46 defines an aperture stop plane. A seventh optical surface 48 defines an exterior surface of first end lens 16$b$. An eighth optical surface 50 defines an interior surface of first end lens 16$b$. A ninth optical surface 52 defines an interior surface of second end lens 20b. A tenth optical surface 54 defines an exterior surface of second end lens 20b. An eleventh optical surface 56 defines an image plane.

In a typical embodiment of the example depicted in FIGS. 1 and 4, the distance from the first optical surface 36 to the second optical surface 38 is one-half the distance from the fifth optical surface 44 to the seventh optical surface 48; and it is also one-half the distance from the tenth optical surface 54 to the exterior surface 58 of the first end lens 16c of the next relay lens set 30 (as shown in FIG. 1).

Consequently, the distance between relay lenses 12a, 12b in a set is the same as the distance between sets of relay lenses 28, 30, 32. Therefore, the length of all inter-lens spacers 33a,b is the same, and the spacers are interchangeable.

Figure 5:
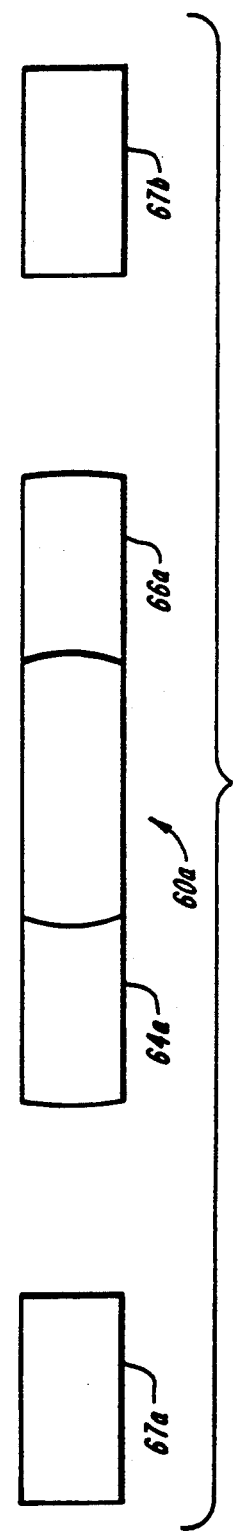
FIG. 5 is an optical schematic view of a Type 2 optical system constructed in accordance with the disclosure of related application U.S. Ser. No. 07/507,877, showing identical inter-lens spacers.

FIGS. 5 and 6 show a second relay lens system 60 disclosed in U.S. Ser. No. 07/507,877. This system is referred to herein as "Type 2." Type 2 is similar to Type 1, except that the Type 2 center lens 62 is not spherical. As depicted in FIGS. 5 and 6, the Type 2 relay lens (60a,b) includes center lenses 62a,b, and end lenses 64a,b affixed to the center lenses 62a,b. Also shown in FIG. 5 are detached, identical Type 2 inter-lens spacers 67a,b.

As depicted in FIG. 6, Type 2 relay lenses 60a,b are arranged in a set 68 of two relay lenses 60a,b. Like the Type 1 relay sets 28, 30, 32, when light rays 70 pass through the Type 2 set 68, eleven Type 2 optical surfaces are defined by the rays and relay lenses 60a,b. A first optical surface 72 defines an object plane. A second optical surface 74 defines an exterior surface of first end lens 64a. A third optical surface 76 defines an interior surface of first end lens 64a. A fourth optical surface 78 defines an interior surface of second end lens 66a. A fifth optical surface 80 defines an exterior surface of second end lens 66a. A sixth optical surface 82 defines an aperture stop plane. A seventh optical surface 84 defines an exterior surface of first end lens 64b. An eighth optical surface 86 defines an interior surface of first end lens 64b. A ninth optical surface 88 defines an interior surface of second end lens 66b. A tenth optical surface 90 defines an exterior surface of second end lens 66b. An eleventh optical surface 92 defines an image plane.

In a typical embodiment of the Type 2 relay lens set depicted in FIG. 6, the distance from the first optical surface 72 to the second optical surface 74 is one-half the distance from the fifth optical surface 80 to the seventh optical distance 84; and it is also one-half the distance from the tenth optical surface 90 to the exterior surface of the next relay lens set (not shown). Consequently, the distance between Type 2 relay lenses 60a,b in a set 68 is the same as the distance between sets of Type 2 relay lens pairs. Therefore, the length of all Type 2 inter-lens spacers 67a,b is the same, and the spacers are interchangeable.

Those skilled in the ar will appreciate from the foregoing that in the Type 1 configuration, the relay optical system includes two identical end lenses that are affixed to opposed ends of a center lens. The axial length of each end lens is equal to or greater than one-half its diameter. The center lens is spherical, so that its radii of curvature are one-half of it axial length.

In the Type 2 embodiment, identical end lenses, having axial lengths equal to or greater than one-half of their diameters, are affixed to opposed ends of a center lens. The opposed ends of the center lens have identical radii of curvature.

In both Type 1 and Type 2 systems, the distance from the object being viewed to the exterior surface of the end lens closest to the object is one-half the distance between relay lenses in a pair, and one-half the distance between sets of relay lens pairs. Therefore, the relay lenses of both embodiments are symmetrical about an axis passing through the center of the center lens, perpendicular to the passage of light through the relay lens. Consequently, the relay lenses cannot be improperly inserted into the optical cylinder of an endoscope. They function properly in either axial alignment. Additionally, because the required distance between pairs of relay lenses and sets of relay lens pairs is identical, only one size inter-lens spacer is required. Accordingly, in inserting the relay lenses into the endoscope, an operator simply inserts a relay lens spacer, relay lens, spacer, and so on. An assembly error is virtually impossible because the relay lenses are identical and symmetrical, as are the inter-lens spacers.

In fabrication of the Type 1 system, the center lens can be made extremely accurately at large volume and low cost, because the center lens is fabricated from a ball or sphere. The identical end lenses are produced by traditional optical shop methods, but in double quantity, and therefore can be produced, at lower cost than non-identical end lenses. Similarly, in fabrication of the Type 2 system, the identical end lenses can be produced at lower cost than in known relay lens.

The cementing operation in both Type 1 and Type 2 embodiments is greatly facilitated because the end lenses, in particular, are quite long, compared to conventional end lenses. Therefore, they can lie straight and centered in an optical "V-block" during cementing. With relay lenses of the Type 1 embodiment, an advantageous assembly procedure includes the step of cementing an end lens at any arbitrary location on a sphere of center lens glass. The sphere is then polished down to a cylinder having the same diameter as that of the affixed end lens. Then, the delicate operation of properly aligning the last end lens can be undertaken, facilitated by the handling advantages of the long, cemented end lens and center lens.

The Type 1 and Type 2 configurations disclosed in related application U.S. Ser. No. 07/507,877 thus provide significant advantages over conventional relay lens systems.

However, in the Type 1 and Type 2 systems, the outer elements are quite long, and therefore difficult to manufacture without further dividing the outer elements.

The present invention overcomes these limitations of the Type 1 and Type 2 embodiments, by utilizing the "Type 3" and "Type 4" configurations depicted in FIGS. 7 and 8. In particular, FIG. 7 depicts a set 128 of endoscope relay lenses 112a, 112b constructed in accordance with the present invention. Two substantially spherical elements 116a, 116b, 120a, 120b are employed on the outside of the three-component relay lens assemblies 112a, 112b. In each relay lens assembly, the two spherical end elements 116a, 120a, and 116b, 120b, respectively, are identical. The central component of each relay lens assembly is a thin symmetrical negative optical element (114a, 114b). The arrangement depicted in FIG. 7 differs from the Type 1and Type 2 optical configurations of FIGS. 1-6, in which a substantially spherical lens element formed the central component of a three-part optical component.

FIG. 7 shows light rays 134 passing through the first set 128 of the Type 3 relay lenses 112a, 112b. The rays 134 and relay lens set 128 define a sequence of eleven optical surfaces, indicated by vertical lines. A first optical surface 136 defines an object plane. A second optical surface 138 defines an exterior surface of first end lens 116a. A third optical surface 140 defines an interior surface of first end lens 116a. A four optical surface 142 defines an interior surface of second end lens 120a. A fifth optical surface 144 defines an exterior surface of second end lens 120a. A sixth optical surface 146 defines an aperture stop plane. A seventh optical surface 148 defines an exterior surface of first end lens 116b. An eighth optical surface 150 defines an interior surface of first end lens 116b. A ninth optical surface 152 defines an interior surface of second end lens 120b. A tenth optical surface 154 defines an exterior surface of second end lens 120b. An eleventh optical surface 156 defines an image plane.

A working example of a set of Type 3 relay lenses is set forth below in Table A.

TABLE A

| McKINLEY RELAY LENS SET, TYPE 3 | | | | |
|---|---|---|---|---|
| SURFACE | RADIUS | THICKNESS | GLASS | |
| 136 | — | 3.000 | AIR | [OBJECT] |
| 138 | 18.500 | 37.000 | SIO2 | |
| 140 | −18.500 | 2.000 | SF11 | |
| 142 | 18.500 | 37.000 | SIO2 | |
| 144 | −18.500 | 3.000 | AIR | |
| 146 | — | 3.000 | AIR | |
| 148 | 18.500 | 37.000 | SIO2 | |
| 150 | −18.500 | 2.000 | SF11 | |
| 152 | 18.500 | 37.000 | AIR | |
| 154 | −18.500 | 3.000 | AIR | |
| 156 | — | — | AIR |  |

In Table A, the numerical value in the "RADIUS" and "THICKNESS" columns are set forth in millimeters. The "GLASS" descriptions are standard optical glass characterizations as found in the product catalog of the Schott Glass Company of the found in the product catalog of the Schott Glass Company of the Federal Republic of Germany. The "THICKNESS" column refers to the distance to the next optical surface. For example, in connection with surface 136, the number 3.000 signifies three millimeters to surface 138. The column "RADIUS" refers to the radii of curvature of the respective curved surfaces. In this working example, the lens diameters are 5.6 millimeters and the overall object-to-image distance is 164.0 millimeters. The object and image diameters are 4.8 millimeters.

Tests of the performance characteristics of this working example of a Type 3 relay lens indicate an Optical Path Difference (OPD) equal to a small fraction of a wavelength of over the entire image area. The example accumulates less than one wavelength of OPD over several sets. Most known relay lenses have at least one wavelength of OPD in some or all of their image area through one set.

The embodiment depicted in FIG. 7 provides further advantages over conventional designs, in that the spherical elements 116a, 116b, 120a, 120b are simple to manufacture, as is the thin central element 114a, 114b. This optical configuration also provides an improvement over the Type 1 and Type 2 lens arrangements shown in FIGS. 1–6, in which the outer elements are quite long and therefore difficult to manufacture without further dividing the outer elements.

By varying the size of the external spherical elements 116a, 116b, 120a, 120b, a desired optical path length can be achieved, consistent with the compact overall length required in many endoscope applications. In particular, short overall length is attained by utilizing relatively large spherical elements. The use of large external spherical elements to attain the required relay path length requires the employment of a very low refractive index for the spherical components, so that the light does not come to a focus within the relay system. This places limits on material selections—such as low-index glass or plastic—and also limits the light-gathering power of this relay design. However, this relay design is advantageously employed in larger endoscopic systems.

Further improvements over conventional relay optical systems are attained by the Type 4 optical system depicted in FIG. 8. In particular, FIG. 8 depicts a set 228 of Type 4 endoscope relay lenses 212a, 212b, similar to relay lens assemblies 112a, 112b depicted in FIG. 7. In the Type 4 embodiment, outer components 221a, 221b, 223a, 223b are incorporated in the relay lens assembly to produce symmetrical five-part relay lens assemblies 212a, 212b.

FIG. 8 shows light rays 234 passing through the set 228 of the Type 4 relay lenses 212a, 212b. The rays 234 and relay lens set 228 define a sequence of fifteen optical surfaces, indicate by vertical lines. A first optical surface 236 defines an object plane. A second optical surface 237 defines an exterior surface of first end lens 221a. A third optical surface 238 defines an interior surface of spherical lens 116a. A fourth optical surface 240 defines an interior surface of spherical lens 216a. A fifth optical surface 242 defines an interior surface of spherical lens 220a. A sixth optical surface 244 defines an interior surface of spherical lens 220a. A seventh optical surface 245 defines an exterior surface of end lens 223a. An eight optical surface 246 defines an aperture stop plane. A ninth optical surface 247 defines an exterior surface of end lens 221b. A tenth optical surface 248 defines an interior surface of end lens 221b. An eleventh optical surface 250 defines an interior surface of spherical lens 216b. A twelfth optical surface 252 defines an interior surface of spherical lens 220b. A thirteenth optical surface 254 defines an interior surface of spherical lens 220b. A fourteenth optical surface 255 defines an exterior surface of end lens 223b. A fifteenth optical surface 256 defines an image plane.

A working example of a set of Type 4 relay lenses is set forth below in Table B.

TABLE B

| McKINLEY RELAY LENS SET, TYPE 4 | | | | |
|---|---|---|---|---|
| SURFACE | RADIUS | THICKNESS | GLASS | |
| 236 | — | 3.000 | AIR | [OBJECT] |
| 237 | 15.445 | 2.000 | BK7 | |
| 238 | 9.486 | 18.973 | BAK2 | |
| 240 | −9.486 | 2.000 | F4 | |
| 242 | 9.486 | 18.973 | BAK2 | |
| 244 | −9.486 | 2.000 | BK7 | |
| 245 | −15.445 | 3.000 | AIR | |
| 246 | — | 3.000 | AIR | |
| 247 | 15.445 | 2.000 | BK7 | |
| 248 | 9.486 | 18.973 | BAK2 | |
| 250 | −9.486 | 2.000 | F4 | |
| 252 | 9.486 | 18.973 | BAK2 | |
| 254 | −9.486 | 2.000 | BK7 | |

TABLE B-continued

McKINLEY RELAY LENS SET, TYPE 4

| SURFACE | RADIUS | THICKNESS | GLASS |
|---------|--------|-----------|-------|
| 255 | −15.445 | 3.000 | AIR |
| 256 | — | — | AIR |

In Table B, the numerical value in the "RADIUS" and "THICKNESS" columns are in millimeters. The "GLASS" descriptions are standard optical glass characterizations as found in the product catalog of the Schott Glass Company of the Federal Republic of Germany. The "THICKNESS" column refers to the distance to the next optical surface. For example, in connection with surface 236, the number 3.000 signifies three millimeters to surface 237. The column "RADIUS" refers to the radii of curvature of the respective curved surfaces. In this working example, the lens diameters are 5.6 millimeters and the overall object-to-image distance is 100.0 millimeters. The object and image diameters are 4.8 millimeters. object-to-image distance is 100.0 millimeters. The object and image diameters are 4.8 millimeters.

Tests of the performance characteristics of this working example of a Type 4 relay lens indicate an Optical Path Difference (OPD) equal to a small fraction of a wavelength over the entire image area. The example accumulates less than one wavelength of OPD over several sets. Most known relay lenses have at least one wavelength of OPD in some or all of their image area through one set.

The outer elements 221a, 221b, 223a, 223b of the Type 4 system provide additional degrees of freedom in the optical design and selection process. In particular, the utilization of the outer elements eliminates the requirement for low-index glass or plastic in the spherical elements 216a, 216b, 220a, 220b, thereby enabling substantial increases in the light-gathering power of the system.

Consequently, the Type 4 system 228 depicted in FIG. 8 can be utilized in even the smallest endoscopes. This configuration can be made quite long, thus requiring fewer relays, compared to conventional designs, or even the designs depicted in FIGS. 1-6 and discussed in U.S. Ser. No. 07/507,877. As such, the system 228 depicted in FIG. 8 is much more cost-effective than other designs, even with its added lens elements. Moreover, light throughput is also increased, and coating problems, such as loss of blue transmission, resulting in yellow images, are minimized.

The Type 3 and Type 4 relay leans systems discussed above and depicted in FIGS. 7 and 8 have complete symmetry, including the image-space and collimated space distances Consequently, these optical systems can be assembled in the endoscope apparatus utilizing all identical spacers, and without necessitating a specific orientation of the lenses. This feature reduces assembly errors and thus reduces assembly time and cost. Cleanliness is also enhanced, as repeated re-assembly due to error is eliminated.

In addition to simplifying manufacture, the Type 3 optical system has long length, thereby minimizing the number of relays sets required in a given system. The Type 3 system also affords excellent optical performance, with a small amount of field curvature. This small curvature can be tolerated because fewer relays are used. The Type 4 system offers ease of fabrication, length, light-gathering power, and excellent optical correction.

The Type 3 and Type 4 relay lens systems of the present invention are suitable for use in standard medical endoscopes, such as the type disclosed in U.S. Pat. No. 4,148,551 to MacAnally, the teachings of which are incorporated herein by reference.

It will thus be seen that the invention efficiently attains the objects set forth above, among those made apparent from the preceding description.

It will be understood that changes may be made in the above construction and in the foregoing sequences of operation without departing from the scope of the invention. For example, the relay lenses of the present invention can be utilized in non-medical optical instruments to transmit an image through a rigid or semi-rigid cylinder. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A relay lens for transmitting an optical image, comprising
   (a) a center lens having opposed ends,
      radii of curvature of said opposed ends of said center lens being substantially identical, and
   (b) two substantially identical end lenses coupled to said opposed ends of said center lens,
      each of said end lenses being substantially spherical,
      each of said end lenses having an axial length that is equal to or greater than approximately one-half its diameter,
   said end lenses and said center lens forming a cylinder,
   so that the relay lens is substantially symmetrical about a plane passing through the center of said center lens perpendicular to an axis passing through the centers of said opposed end lenses.

2. The relay lens of claim 1 wherein
   said center lens has an axial length that is equal to or less than approximately one-half its diameter.

3. A relay lens set for transmitting an optical image of an object, comprising
   a pair of substantially identical relay lenses, each of said relay lenses comprising
      (a) a center lens having opposed ends,
         radii of curvature of said opposed ends of said center lens being substantially identical, and
      (b) two substantially identical end lenses coupled to said opposed ends of said center lens,
         each of said end lenses being substantially spherical,
         each of said end lenses having an axial length that is equal to or greater than approximately one-half its diameter,
      said end lenses and said center lens forming a cylinder,
      so that said relay lens is symmetrical about a plane passing through the center of the center lens perpendicular to an axis passing through the centers of the opposed end lenses, wherein radii of curvature and axial lengths of said end lenses and center lenses cooperate so that optimal performance of the relay lens set is achieved when the distance from the object to the closest relay lens is approximately one-half the distance between the pair of relay lenses in the set.

4. The relay lens set of claim 3 wherein said center lens has an axial length that is equal to or less than approximately one-half its diameter.

5. The relay lens set of claim 3 wherein the relay lens set transmits an optical image to a second, identical, relay lens set and the distance from the object to the closest relay lens is approximately one-half the distance between the relay lens set and the second relay lens set.

6. A relay lens set system for transmitting an optical image of an object through a plurality of relay lens sets, the relay lens set system comprising
a first relay lens set and an identical, adjacent second relay lens set, each of said relay lens sets including
a pair of identical relay lenses, said relay lenses comprising
(a) a center lens having opposed ends,
radii of curvature of said opposed ends of said center lens being substantially identical,
(b) two substantially identical end lenses coupled to said opposed ends of said center lens,
each of said end lenses being substantially spherical,
each of said end lenses having an axial length that is equal to or greater than approximately one-half its diameter,
said end lenses and center lens forming a cylinder.
so that the relay lens is substantially symmetrical about a plane passing through the center of the center lens perpendicular to an axis passing through the centers of the opposed end lenses,
wherein radii of curvature and axial lengths of the end lenses and center lens cooperate so that optimal performance of the relay lens set system is achieved when the distance from the object to the closest relay lens is approximately one-half the distance between the pair of relay lenses in the first relay lens st and approximately one-half the distance between the first and second relay lens sets.

7. The relay lens set system of claim 6 wherein the distance from the object to the closest relay lens is approximately one-half the distance between any adjacent relay lens sets.

8. The relay lens set system of claim 6 wherein said center lens has an axial length that is equal to or less than approximately one-half its diameter.

9. A relay lens for transmitting an optical image, comprising
(a) a center lens having opposed ends,
radii of curvature of said opposed ends of said center lens being substantially identical,
(b) two substantially identical intermediate lenses coupled to said opposed ends of said center lens,
each of said intermediate lenses being substantially spherical,
each of said intermediate lenses having an axial length that is equal to or greater than approximately one-half its diameter, and
(c) two substantially identical end lenses coupled to said substantially spherical intermediate lenses,
said end lenses, intermediate lenses and center lens forming a cylinder,
so that the relay lens is substantially symmetrical about a plane passing through the center of the center lens perpendicular to an axis passing through the centers of the opposed end lenses.

10. The relay lens of claim 9 wherein said center lens has an axial length that is equal to or less than approximately one-half its diameter.

11. A relay lens set for transmitting an optical image of an object, comprising
a pair of substantially identical relay lenses, each of said relay lenses comprising
(a) a center lens having opposed ends,
radii of curvature of said opposed ends of said center lens being substantially identical,
(b) two substantially identical intermediate lenses coupled to said opposed ends of said center lens,
each of said intermediate lenses being substantially spherical,
each of said intermediate lenses having an axial length that is equal to or greater than approximately one-half its diameter, and
(c) two substantially identical end lenses coupled to said substantially spherical outer end surfaces of said intermediate lenses,
said end lenses, intermediate lenses and center lens forming a cylinder,
so that the relay lens is substantially symmetrical about a plane passing through the center of the center lens perpendicular to an, axis passing through the centers of the opposed end lenses,
wherein radii of curvature and axial lengths of the end lenses and center lens cooperate so that optimal performance of the relay lens set is achieved when the distance from the object to the closest relay lens is approximately one-half the distance between the pair of relay lenses in the set.

12. The relay lens set of claim 11 wherein said center lens has an axial length that is equal to or less than approximately one-half its diameter.

13. The relay lens set of claim 11 wherein the relay lens set transmits an optical image to a second, identical, relay lens set and the distance from the object to the closest relay lens is approximately one-half the distance between the relay lens set and the second relay lens set.

* * * * *